US010452447B2

(12) United States Patent
LaMantia et al.

(10) Patent No.: US 10,452,447 B2
(45) Date of Patent: *Oct. 22, 2019

(54) COORDINATING MULTIPLE SECURITY COMPONENTS

(71) Applicant: LOOKOUT, INC., San Francisco, CA (US)

(72) Inventors: Matthew John Joseph LaMantia, San Francisco, CA (US); Brian James Buck, Livermore, CA (US); Stephen J. Edwards, San Francisco, CA (US); William Neil Robinson, Sunnyvale, CA (US)

(*) Notice: Subject to any disclaimer, the term of this patent is extended or adjusted under 35 U.S.C. 154(b) by 206 days.

This patent is subject to a terminal disclaimer.

(21) Appl. No.: 15/620,784

(22) Filed: Jun. 12, 2017

(65) Prior Publication Data
US 2017/0277570 A1 Sep. 28, 2017

Related U.S. Application Data

(63) Continuation of application No. 14/842,771, filed on Sep. 1, 2015, now Pat. No. 9,740,531.

(60) Provisional application No. 62/186,224, filed on Jun. 29, 2015.

(51) Int. Cl.
*G06F 9/50* (2006.01)
*H04L 29/06* (2006.01)

(52) U.S. Cl.
CPC ........... *G06F 9/5038* (2013.01); *H04L 67/42* (2013.01)

(58) Field of Classification Search
CPC .................. G06F 9/5038; H04L 67/42
See application file for complete search history.

(56) References Cited

U.S. PATENT DOCUMENTS

| 4,183,083 | A | 1/1980 | Chatfield |
| 9,117,075 | B1* | 8/2015 | Yeh .......................... G06F 21/56 |
| 9,740,531 | B2* | 8/2017 | LaMantia ................ H04L 67/42 |
| 2006/0080656 | A1* | 4/2006 | Cain .......................... G06F 8/65 717/174 |
| 2006/0259591 | A1 | 11/2006 | Hashimoto |
| 2007/0024717 | A1 | 2/2007 | Chatenever et al. |
| 2007/0061557 | A1 | 3/2007 | Shaun et al. |
| 2010/0115048 | A1 | 5/2010 | Scahill |

(Continued)

*Primary Examiner* — S. Sough
*Assistant Examiner* — Phuong N Hoang
(74) *Attorney, Agent, or Firm* — Redbrick IP, P.C.

(57) ABSTRACT

A system and method for coordinating security components, including: determining, by an application executing on a client device, a need to perform a sharable functional task; identifying a first security component and a second security component installed on the client device and capable of performing variations of the sharable functional task, where variations of the sharable functional task are functionally overlapping and not identical; identifying a set of characteristics characterizing the first security component and the second security component; selecting the second security component as a primary security component for performing a variation of the sharable functional task based on the set of characteristics; delegating, by one or more processors, performance of the sharable functional task to the primary security component; and instructing the processors to cause functionality associated with the first security component to be at least partially suspended.

29 Claims, 6 Drawing Sheets

(56) References Cited

U.S. PATENT DOCUMENTS

| | | | |
|---|---|---|---|
| 2012/0084791 A1* | 4/2012 | Benedek | G06F 13/14 719/313 |
| 2013/0132457 A1 | 5/2013 | Diwakar | |
| 2014/0250511 A1* | 9/2014 | Kendall | H04L 63/0815 726/6 |
| 2014/0344823 A1 | 11/2014 | Brock et al. | |
| 2014/0351716 A1 | 11/2014 | Steinbok et al. | |
| 2016/0180087 A1* | 6/2016 | Edwards | G06F 21/566 726/24 |

* cited by examiner

COORDINATING MULTIPLE SECURITY COMPONENTS

CROSS-REFERENCE TO RELATED APPLICATIONS

This application is a continuation of U.S. patent application Ser. No. 14/842,771, entitled "COORDINATING MULTIPLE COMPONENTS", filed on Sep. 1, 2015. Accordingly, this application claims priority from U.S. patent application Ser. No. 14/842,771 under 35 U.S.C. § 120.

U.S. patent application Ser. No. 14/842,771 claims the benefit of U.S. Provisional Application No. 62/186,224, "COORDINATING MULTIPLE COMPONENTS", filed Jun. 29, 2015. U.S. patent application Ser. No. 14/842,771 and U.S. Provisional Application No. 62/186,224 are hereby incorporated by reference, in their entirety, for all purposes.

BACKGROUND

The proliferation of electronic devices has increased the popularity and use of both mobile and non-mobile computing devices. For example, personal computers (PCs), mobile smartphones, tablet computing devices, and smart watches have become popular. As a result, users may own and/or use multiple devices. These devices typically include various operating systems that support the execution of various software applications and components. For example, users may use these devices to execute web-browsers, email clients, geographical map applications, game applications, music applications, security software, and so on. Further, software or hardware with the same or similar functionality may be included in the same device or across multiple devices accessible to a user.

SUMMARY

In general, in one aspect, embodiments relate to a method, implemented by one or more processors, that can include: determining, by a first security component of an application executing on a client device, a need to perform a sharable functional task; identifying a set of software components installed on the client device and capable of performing variations of the sharable functional task, where variations of the sharable functional task are functionally overlapping and not identical; establishing inter-app communication between the first security component and at least a second security component of the set of software components; identifying a set of characteristics characterizing both the first security component and the second security component; selecting, using the first security component and the second security component, the second security component as a primary security component for performing a variation of the sharable functional task based on the set of characteristics, where the set of characteristics includes at least a version number; delegating, by the one or more processors, performance of the sharable functional task to the primary security component; and instructing the one or more processors to cause functionality associated with the first security component to be at least partially suspended.

In general, in one aspect, embodiments relate to a system that can include: a computer processor; and a manager module executing on the computer processor and configured to cause the computer processor to: determine a need to perform a sharable functional task, identify a set of software components installed on the client device and capable of performing variations of the sharable functional task, where variations of the sharable functional task are functionally overlapping and not identical, identify a set of characteristics characterizing both a first security component and a second security component of the set of software components, select the second security component as a primary security component for performing a variation of the sharable functional task based on the set of characteristics, where the set of characteristics includes at least a version number; delegate, using the computer processor, performance of the sharable functional task to the primary security component, and instruct the computer processor to cause functionality associated with the first security component to be at least partially suspended.

In general, in one aspect, embodiments relate to a non-transitory computer-readable storage medium having instructions configured to execute on at least one computer processor to enable the computer processor to: determine, using a first security component of an application, a need to perform a sharable functional task; identify a set of software components installed on the client device and capable of performing variations of the sharable functional task, where variations of the sharable functional task are functionally overlapping and not identical; establish communication with the first security component and at least a second security component of the set of software components; identify a set of characteristics characterizing both the first security component and the second security component; select, using the first security component and the second security component, the second security component as a primary security component for performing a variation of the sharable functional task based on the set of characteristics, where the set of characteristics includes at least a version number; instruct the at least one computer processor to delegate performance of the sharable functional task to the primary security component; and instruct the at least one computer processor to cause functionality associated with the first security component to be at least partially suspended.

In general, in one aspect, embodiments relate to a method, implemented by one or more processors, that can include: determining, using a first security component of an application, a need to perform a sharable functional task; identifying a set of software components capable of performing variations of the sharable functional task, where variations of the sharable functional task are functionally overlapping and not identical, and where the set of software components comprises at least a second security component; identifying a set of characteristics characterizing each software component of the set of software components; selecting, using the first security component and the second security component, the second security component as a primary security component for performing a variation of the sharable functional task based on a rank value of each of the set of software components, where the rank values are calculated using the set of characteristics; delegating, by the one or more processors, performance of the sharable functional task to the primary security component; and suspending, by the one or more processors, functionality associated with the first security component.

Other embodiments will be apparent from the following description and the appended claims.

BRIEF DESCRIPTION OF THE DRAWINGS

Embodiments are illustrated by way of example, and not by way of limitation, in the figures of the accompanying drawings and in which like reference numerals refer to similar elements.

DETAILED DESCRIPTION

Figure 1A:
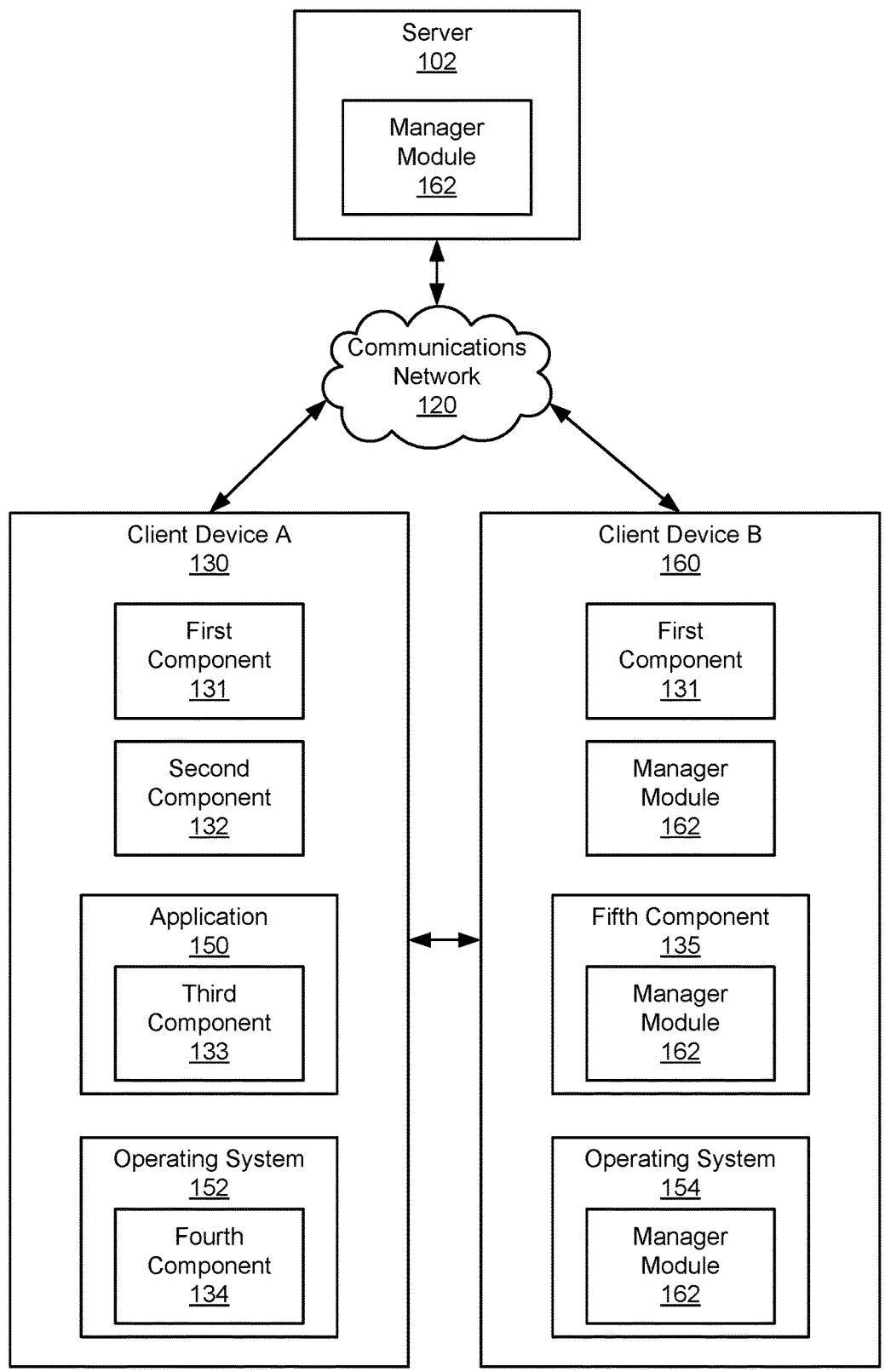
FIGS. 1A-1B show example diagrams of client devices and other elements, in accordance with one or more embodiments.

Specific embodiments will now be described in detail with reference to the accompanying figures. Like elements in the various figures are denoted by like reference numerals for consistency. In the following detailed description of embodiments, numerous specific details are set forth in order to provide a more thorough understanding of the invention. However, it will be apparent to one of ordinary skill in the art that the invention can be practiced without these specific details. In other instances, well-known features have not been described in detail to avoid unnecessarily complicating the description.

In general, embodiments of the present disclosure provide a method and system for coordinating software components of a computing device. For example, a client device may include one or more software components. The software components may include the same or similar functionality. Embodiments may allow coordination of the software components such that only one of the software components performs certain functions or operations (e.g., malware scanning and other security functions). Other software components may be caused to partially or fully suspend operation. Coordinating software components may be desirable because unnecessarily duplicative operations may be prevented and unnecessary consumption of resources may be prevented (e.g., computer processor time, battery, and/or network bandwidth). Further, coordinating software components may be desirable because duplicative operations resulting in incorrect or undesirable behavior may be prevented (e.g., reporting malware detections more than once).

Embodiments provide that the operations are performed the correct number of times (e.g., exactly once), by the correct software components, and/or on the correct schedule. Embodiments provide that the operations are performed by trusted/genuine/certified software components (and that a malicious software component cannot prevent the correct software component from performing operations). For example, impostor or malicious software may be prevented from preventing security scanning by trusted software components by pretending to take responsibility for the operation.

Embodiments provide that the operations are performed by the specific instance of the software components that is most desirable or has the highest priority (e.g., for technical and/or business reasons). For example, the operations may be performed by the best and/or most proper instance of the software component. In one example, the most up-to-date version of a software component may be selected. In another example, the software component that is most desirable for user experience reasons may be selected (e.g., a business or customer-facing version). For example, an enterprise-level software component may take priority over a consumer-level or white-label-branded software component for performing security scanning and reporting.

Figure 1B:
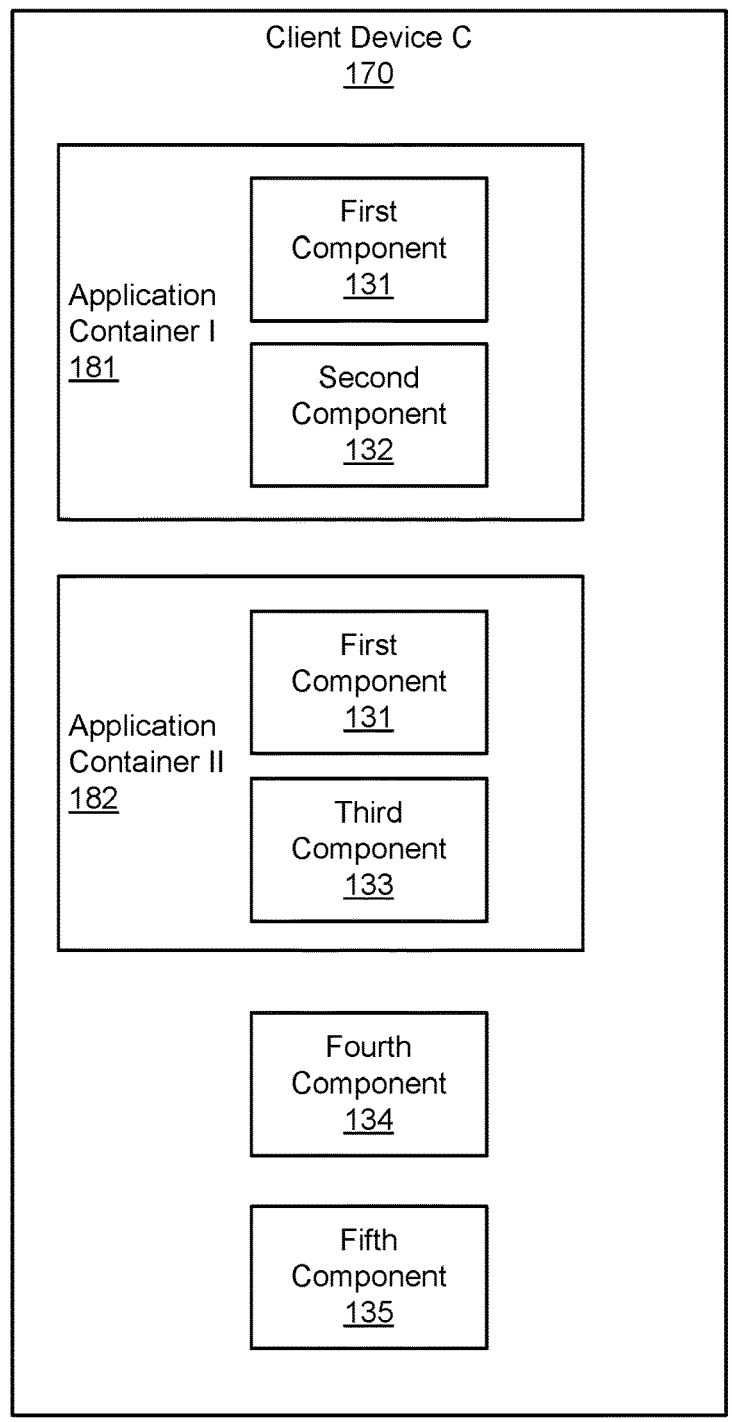
Figure 2D:
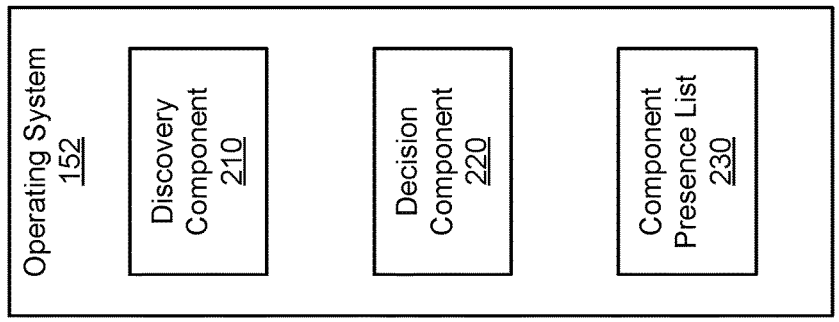
FIGS. 2A-2D show example component arrangements, in accordance with one or more embodiments.
Figure 2C:
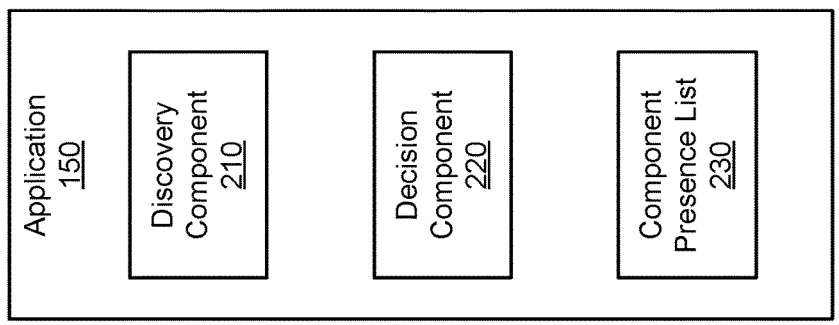
Figure 2B:
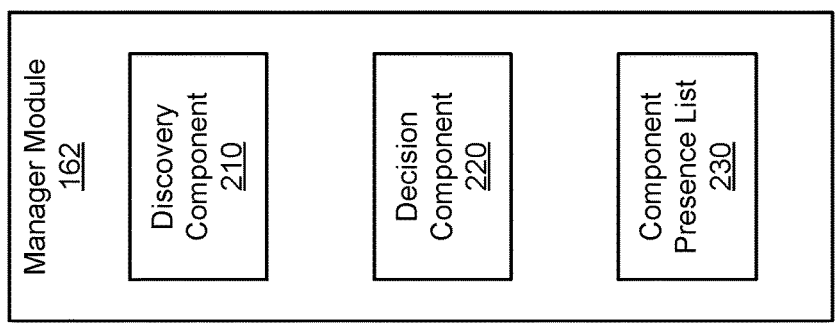
Figure 2A:
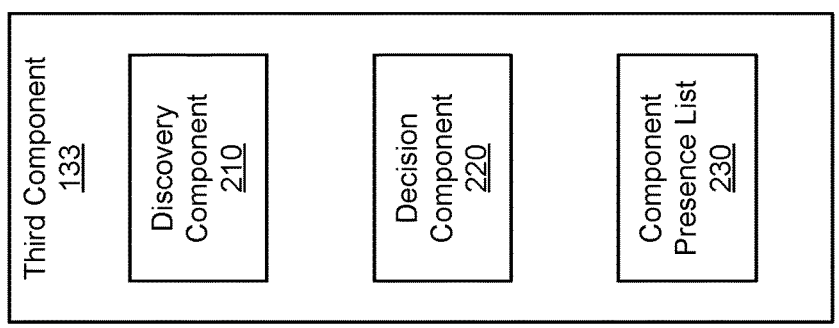

FIG. 1 shows an example diagram of client devices and other elements, in accordance with one or more embodiments. FIG. 1 includes a server 102, a communications network 120 (which may be the same or similar to the network 520 of FIG. 5), a client device A 130, and a client device B 160. The server 102, the client device A 130, and the client device B 160 may be communicatively coupled with one another through the communications network 120. Alternatively or in addition, the client device A 130 and the client device B 160 may be communicatively coupled with one another directly (e.g., via Bluetooth, Bluetooth LE (BLE), Near Field Communication (NFC), a wired connection, or any near field or short range communications).

The client devices 130 and 160 may be a mobile device (e.g., laptop computer, smart phone, wearables like a smart watch, personal digital assistant, tablet computer, or other mobile device), a desktop computer, a smart television, a smart home appliance, an electronic kiosk stand, a smart automobile, a server, or any other type of computing device that includes at least the minimum processing power, memory, and input and output device(s) to perform one or more embodiments. The client devices 130 and 160 may each include one or more software components, for example, software components 131-135. The software components 131-135 may be identical, may be different versions of similar software components, or may be wholly different software implementations with responsibility for performing similar operation(s). Different software components, which may be the same or similar, may operate according to different policies.

Each software component may include a set of functionality. The set of functionality that a first software component includes may be a different set of functionality from that of a second software component. The sets of functionalities may overlap, and the overlap may be complete (both software components may have the same set of functionality) or there may be items of functionality that the first software component has that the second software component does not have, or vice versa. Each software component, and optionally each item of functionality, may have an associated version number. For example, a first software component may have version 2 of a functionality item and a second software component may have version 3 of a functionality item.

In one or more embodiments, the software components may include various functionalities related to software security. Examples of functionality can include but are not limited to: Scanning an application at, before, or after installation time for malware or other security or privacy problems; Scanning an application arriving on a network interface at device for malware or other security or privacy problems; Scanning an application or file arriving in a file system (main file system or a mountable/removable file system) for malware, malformed file structure, or other security or privacy problems; Scanning an application or file already in a file system (main file system or a mountable/removable file system) for malware or malformed file structure or other security or privacy problems; Scanning a device for vulnerabilities in firmware, OS, sensors, device drivers, apps; Safe browsing monitoring for malware or privacy issues based on known white lists, black lists, or using content inspection; Monitoring inbound network connections for malware or malformed protocols or other security or privacy problems; Monitoring outbound network connections for malware or malformed protocols or other security or privacy problems; Performing device location or tracking functions, such as obtain and report device geolocation or Signal Flare; Performing device theft or loss protection functions, such as LockCam or Theft Alerts (e.g., on events such as SIM card removal, incorrect passcode entry, airplane mode enablement, device power off, device admin disablement, or any other possible events); Monitoring for low remaining power in a battery of the client device; Performing device data backup (e.g., for contacts, call logs, photos, movies, or other data on device); Performing DLP functions (Data Loss Prevention) for data entering or leaving the device; and/or Performing actions on the device, such as lock, wipe, change of security or other settings or configuration in the OS or in apps.

In one or more embodiments, the software components 131-135 may be standalone software applications. For example, the first software component 131 and the second software component 132 may be standalone software applications. In some embodiments, the software components 131-135 may be integrated into an application or service (e.g., by use of a Software Development Kit). For example, the third software component 133 may be integrated into an application 150. In some embodiments, the software components 131-135 may be integrated into operating system software. For example, the fourth software component 134 may be integrated into an operating system 152 of the client device 130 (or otherwise integrated as a system level process of the client device 130). In some embodiments, the software components 131-135 may be white-label-branded software components (i.e., a software component rebranded for business or user experience reasons).

Client devices may include application containers. An application container of a client device may be an isolated and/or protected workspace in which applications/components can be installed and/or executed, and for which special policies (such as from an enterprise administrator) may be provided. More than one application container may be included in a client device. For example, in FIG. 1B, a client device C 170 may include one or more application containers such as an application container I 181 and an application container II 182. The application container I 181 and II 182 may include one or more applications/components (e.g., the first software component 131 and the second software component 132, and the first software component 131 and the third software component 133, respectively). For example, when a client device is used for both personal and corporate/business/work purposes, one or more application containers (e.g., the application container I 181 and the application container II 182) may be used to protect sensitive corporate applications and information from a personal portion of a client device, and/or vice versa.

However, in some embodiments, software components may include permissions to communicate with other software components in other application containers (e.g., to notify other software components that a device that one or both software components are executing on has been lost, to share result data, and so on). In addition, one or more applications/components may not be installed in an application container even when application containers are present on a client device. For example, the fourth software component 134 and the fifth software component 135 may be installed outside of any application container.

The same application/component may be installed in more than one application container of the same client device. For example, the first software component 131 may be installed in both the application container I 181 and the application container II 182.

Returning to FIG. 1A, in one or more embodiments, a manager module 162 includes functionality to facilitate coordination of the software components 131-135. The manager module 162 may also include functionality to manage installation of applications/components on a client device. In some embodiments, the manager module 162 is included in the server 102, is included as a standalone software application in a client device (e.g., the manager module 162 included in the client device 160), is integrated into a software component (e.g., the manager module 162 included in the fifth software component 135), and/or is integrated into an operating system (e.g., the manager module 162 included in an operating system 154 of the client device 160). Although the same reference number is used for the manager module 162 in the figures, it should be appreciated that different instances of the manager module 162 may be different versions of the manager module 162 (e.g., depending on the location of the manager module 162). In other words, more than one instance and/or version of the manager module 162 may exist, and the multiple instances may cooperate/collaborate with one another.

Although only one server 102 is illustrated, it should be appreciated that this one server may represent many computer systems, arranged in a central or distributed fashion. For example, such computer systems may be organized as a central cloud and/or may be distributed geographically or logically to edges of a system. It is understood that virtually any number of intermediary networking devices, such as switches, routers, servers, etc., may be used to facilitate communication.

In one or more embodiments, the manager module and/or a discovery component includes functionality to determine a need to determine a primary software component of a client device. For example, the manager module 162 may determine a need to determine a primary software component in response to receiving a request (e.g., from a software component, from another instance of a manager module, from an OS, and/or from a server), an expiration of a timer, a predefined schedule, a connecting/removing of an external device with the client device, an event generated by software, an event related to various functionalities related to software security (e.g., discussed above), and/or any other event. For example, referring to FIG. 1, the server 102 may send the request to one or more manager modules 162. In another example, the first software component 131 may send the request to the manager module 162 before beginning an operation in order to determine whether another software component is more appropriate for executing the operation.

The first software component 131 may send the request to the manager module 162 through the communications network 120 or direct communication if the manager module 162 is located on the server 102 or on a different client device. The first software component 131 may send the request to the manager module 162 without using the communications network 120 if the manager module 162 is located in the first software component 131 or otherwise in the same client device as the first software component 131. However, even if the manager module 162 is located in the same client device as the first software component 131, the first software component 131 may send the request through the communications network 120 and/or through the server 102 instead of solely internally within the client device.

In one or more embodiments, the manager module and/or the discovery component includes functionality to begin a process to identify the software component(s) of the client device independent of a request. For example, the discovery component may begin identifying software components upon a client device boot operation, a client device wake operation, a detection of an installation of a new or updated application/component, a launch of a new or updated application/component, and/or a detection of the removal or deletion of an application/component.

In one or more embodiments, the manager module and/or the discovery component includes functionality to identify a first software component and a second software component of the client device. For example, there may be one or more software components included in the client device 130. The manager module 162 may identify the software components that are relevant to the request to determine a primary software component. For example, the manager module 162 may identify the first software component 131 and the second software component 132 (or the third software component 133, the fourth software component 134, or the fifth software component 135) of the client device 130 or 160.

In some embodiments, the discovery component is included in an application, and therefore the application on the client device may identify the software components. In some embodiments, the discovery component is included in a standalone manager module on the client device, and therefore the standalone manager module on the client device may identify the software components. In some embodiments, the discovery component is included in the operating system of the client device, and therefore the discovery component in the operating system may identify the software components. In some embodiments, the discovery component is included in a server (optionally in a manager module on the server), and therefore the discovery component on the server may identify the software components.

In some embodiments, when a manager module and/or a discovery component on a server identify the software components, the manager module and/or the discovery component may access, request, and/or receive a presence list that includes information about software components that are installed and/or executing on the client device. For example, the presence list may include identifiers of the software components, version information, identification of application containers containing the software components, and so on. The presence list may be stored on and maintained by the server. An updated presence list may be provided each time a software component is added, removed, or modified on the client device.

In one or more embodiments, the manager module and/or the discovery component include functionality to identify software components on the client device that include the same or similar software component to a software component of interest (e.g., a software component that initiated the request). The manager module and/or the discovery component may access the presence list to determine if any of the same or similar software components are present, how many are present, and whether they are components similar to the software component of interest. The presence list may be maintained by and available from the manager module, operating system of the client device, or the server. The manager module and/or the discovery component may determine if any of the identified software components are executing (e.g., by querying the operating system).

In one embodiment, the manager module and/or the discovery component inspect every application, component, and/or service on the client device to identify software components of interest. In another embodiment, the manager module and/or the discovery component search only for applications, components, and/or services on an eligibility list (e.g., by using package name or signing identifier). The eligibility list may be obtained from server. The manager module and/or the discovery component may check with the server to determine whether the software component has a cached copy of the eligibility list to determine if any entries on the eligibility list have been removed/revoked, or to determine if a more recent copy of eligibility list is available. The manager module and/or the discovery component may examine the contents of each candidate software component for embedded information (e.g., a particular permission in the application's manifest).

The manager module and/or the discovery component may identify one software component for a certain function and another software component for a different function (e.g., one service may be for malware detection and another service may be for lost or missing device location).

In some embodiments, the manager module and/or the discovery component may search for and/or identify software components entirely within a particular application container (e.g., within a work application container or within a personal application container). In some embodiments, the manager module and/or the discovery component may search for and/or identify software components across multiple application containers. An application including a discovery component on a client device may require special privileges (such as being preloaded or having a special permission) to be able to perform discovery across application containers. A manager module and/or discovery component located on a server may search for and/or identify software components when separate discovery components executing in different containers on the same device provide a presence list to the server.

In one or more embodiments, the manager module and/or discovery component includes functionality to determine authenticity of the software component(s). For example, the manager module 162 may determine authenticity based on digital signature certificate(s) of the first software component 131 and the second software component 132, by comparing against a known list of signers locally or by querying a remote server (e.g., the server 102). In another example, the manager module 162 may determine authenticity based on the presence or absence of code sequences, or the similarity or dissimilarity to known good or bad software components.

In yet another example, the manager module 162 may determine authenticity based on a calculated hash value of the software components, compared with a list of known, predetermined, and/or trusted authentication hash values locally or by querying a remote server. The calculated hash value may be calculated using known hashing algorithms, for example cyclic redundancy check (CRC), MD5, or SHA-1.

A software component may include a callable interface that the manager module 162 and/or discovery component can call. The callable interface may send a nonce or token to the server associated with the software component. The server may sign the nonce or token with its certificate and send the result in a separate network communication to the original software component, or send the result back to the software component that sends the signed nonce or token to the caller. The manager module 162 can verify that the signature provided was a valid signing by the server's certificate of the original nonce or token, and therefore the software component was considered valid by the server. The server may perform separate authentication steps with the software component that sent it the request to sign the nonce or token. Any of the network connections may use certificate pinning to prevent Man-in-The-Middle (MiTM) attacks. The manager module 162 may send the results of the identified software components to a server, which may determine which of the identified software components are authentic.

In one or more embodiments, the manager module or the discovery component includes functionality to identify a set of characteristics of the first software component and the second software component. For example, the manager module 162 may identify version information, edition information (e.g., enterprise or consumer level component), policy information (e.g., a set of rules that a software component may use to configure or constrain functionality), registration status, installation location, and/or functional capability of the first software component 131 and the second software component 132.

In one or more embodiments, the manager module or a decision component includes functionality to determine that the first software component is the primary software component based on the set of characteristics of each software component. In one or more embodiments, the manager module or the decision component includes functionality to compare and/or rank the set of characteristics of each software component and select the primary software component based on the set of characteristics with a highest priority and/or ranking. For example, the manager module 162 may provide the set of characteristics to a remote server and query the remote server (e.g., the server 102) to receive a determination of relative priority between the first software component 131 and the second software component 132 to determine which software component is the primary software component. In another example, the manager module 162 may query a remote server regarding the status of the software components (e.g., whether each is active, has been registered, and so on) to determine the primary software component.

In yet another example, if the manager module 162 is located in one of the software components, the manager module 162 may query other software components for an ordinal priority and compare the priority of the software component with those of the other software components to determine the primary software component. In another example, the manager module 162 may access a presence list of software component identifiers (e.g., names) with associated priorities, and determine the primary software component based on the presence list. The presence list may also include other information including metadata (such as filename, package name, signing identifier) or portions of the software component (application/component manifest, resources within the application/component, permissions declared and used, etc.).

In one example, the most up-to-date version of a software component may be selected. In another example, the software component that is most desirable for user experience reasons may be selected (e.g., a business or customer-facing version). For example, an enterprise-level software component may take priority over a consumer-level or white-label-branded software component for performing security scanning and reporting. In yet another example, the software component with more resources available to it may be selected (e.g., computer processor time, battery, and so on). In a further example, a software component may be selected based on policy (e.g., strictest policy), registration status (e.g., whether a software component has been registered with a developer or with a manager module), and/or or activation status (e.g., active, executing, or executable software component). In another example, a software component may be selected based on installation location (e.g., whether a software component is installed in a client device, in or outside of an application container, in a client device of multiple client devices, or in a server). In yet another example, a software component may be selected based on functional capability.

In one or more embodiments, the manager module and/or decision component includes functionality to cause functionality associated with the second software component to be at least partially suspended. For example, the manager module 162 may instruct the second software component 132 to at least partially suspend (or deactivate, disable, suppress, standby, or hibernate) all or some operations. In some embodiments, execution of the second software component 132 may be entirely disabled (the software component 132 may first receive approval to be disabled by the server 102). In other embodiments, minimal execution of the second software component 132 may be maintained (e.g., for executing an internal manager module, for monitoring whether a primary software component is still installed and/or executing, for responding to queries, for routine operations like checking for updates, and so on).

In some embodiments, the manager module selects software components for activation or suspension independently in each application container of a client device. For example, the manager module may select a primary software component in a work application container and a primary software component in a personal application container, where the selected primary software components may or may not be the same software component.

In some embodiments, some functions of the first software component 131 may be suspended and some functions are enabled or allowed to continue executing, while some functions of the second software component 132 may be suspended and some functions are enabled or allowed to continue executing. The functions allowed to execute may be different between the first software component 131 and the second software component 132, while the suspended functions may be different between the first software component 131 and the second software component 132. Accordingly, the first software component 131 and the second software component 132 may both continue executing but without duplicative functionality.

In one or more embodiments, multiple software component instances (whether the same or similar software component) may include multiple policies that may not be the same. The software component selected to be the primary software component may be informed about the existence of all of the relevant policies that exist. There may be multiple parameters within a given policy. For each parameter, the primary software component may: Use a superset of policy parameters (e.g., reporting incidents for any of the items called out in the multiple reporting requirements portion of each policy); Select policy parameters that belong with the policy that is normally associated with the primary software component (e.g., pin code unlock access to the device vs. swipe pattern unlock access to the device); Select the most functionally inclusive of the parameters from the set of policies (e.g., use the highest data rate permitted from all the policies); and/or Select the most restrictive functionality of the parameters from the set of policies (e.g., disable the camera if one of the policies has this parameter set).

In some embodiments, while a primary software component is the main software component performing functions and one or more other software components are at least partially suspended, the primary software component may share results related to its operations with the suspended software components. The primary software component may share the results by: Storing the results in a data store on the client device accessible to the other software components; Providing a callable content provider service that other software components can call to obtain the results; Sending the results to a server from which the other software components can request results; Sharing the results through a manager module; and/or via an IPC (Inter Process Communication). As a result, other software components may not duplicate notifications.

In one or more embodiments, the manager module, discovery component, or other software components (partially suspended or executing) may monitor whether the primary software component is still installed, executing, and/or performing the functions for which it was selected as the primary software component. Upon a determination that the primary software component is uninstalled, not executing, and/or not otherwise performing the functions for which it was selected: The primary software component may be caused to be installed and/or executed; another software component that ranked highly during the original determination of the primary software component may be selected as the primary software component (and optionally verified to be installed and executable); a partially suspended software component that may have monitored and detected the lack of execution by the primary software component may resume execution; and/or a re-determination process may be commenced to determine the primary software component among all software components present on the client device. A re-determination process may evaluate, compare, and/or rank the software components present at the time of the re-determination, which may include a different set of software components than in the original determination (e.g., due to software component uninstallation, deactivation, crashes. etc.).

It should be understood that embodiments are not limited to coordinating software components on a single device, but also provide coordinating software components across multiple devices. For example, there may be multiple devices that are at least occasionally communicatively coupled with one other (e.g., the client devices 130 and 160). It may be advantageous or necessary that software components of the client devices 130 and 160 cooperate in performing at least some items of functionality.

For example, a smart watch may be tethered with a smartphone. The smart watch may have local connectivity with the smartphone and may utilize the network connectivity of the smartphone for broader connectivity (e.g., to the Internet). Because applications or data may transfer to the smart watch from the smartphone, security or privacy protection features (e.g., scanning for malware) of an application on the smartphone may be implemented before the application is transmitted to the smart watch, rather than performing a scan by a component on the smart watch itself (which would consume relatively limited computing and battery resources on the smart watch).

In another example, a network appliance may contain a secure gateway component that can inspect the endpoints of communications to and from a smartphone (while it is connected to the network appliance, e.g., via WiFi), and/or can inspect the contents of communications to and from the smartphone (apps, data, etc.). A network appliance may have relatively more computing and power resources, and as a result it may be preferable to perform certain items of functionality by a component on the network appliance rather than in the more resource-constrained smartphone.

FIGS. 2A-2D show example component arrangements, in accordance with one or more embodiments. A discovery component 210, a decision component 220, and a (component) presence list 230 may be included in various locations.

For example, they may be located in a software component (e.g., the third component 133); in a manager module (e.g., the manager module 162); in an application (e.g., the application 150); and/or may be part of an operating system (e.g., the operating system 152). All components or lists may not necessarily exist in one location, e.g., only the discovery component 210 and decision component 220 may exist in the manager module 162 while only the presence list 230 exists in the operation system 152.

Figure 3:
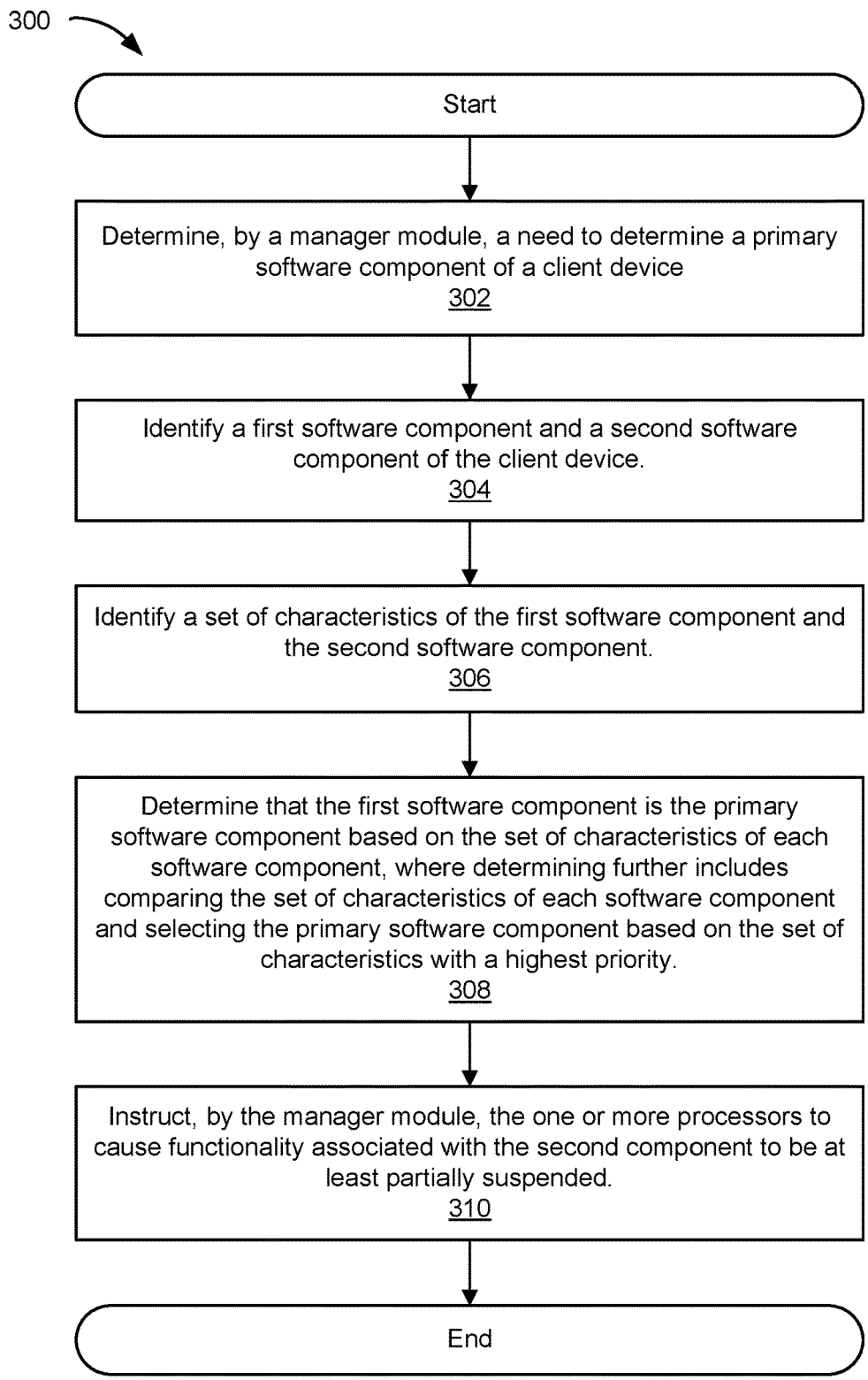
FIG. 3 shows a flowchart in accordance with one or more embodiments.

FIG. 3 shows a flowchart of a method. While the various steps in this flowchart are presented and described sequentially, one of ordinary skill will appreciate that some or all of the steps can be executed in different orders and some or all of the steps can be executed in parallel. Further, in one or more embodiments, one or more of the steps described below can be omitted, repeated, and/or performed in a different order. Accordingly, the specific arrangement of steps shown in FIG. 3 should not be construed as limiting the scope of the invention.

In STEP 302, a request to determine a primary software component of a client device is received at a manager module.

In STEP 304, a first software component and a second software component of the client device are identified.

In STEP 306, a set of characteristics of the first software component and the second software component are identified.

In STEP 308, that the first software component is the primary software component is determined based on the set of characteristics of each software component, where determining further includes comparing the set of characteristics of each software component and selecting the primary software component based on the set of characteristics with a highest priority.

In STEP 310, the one or more processors are instructed by the manager module to cause functionality associated with the second software component to be suspended.

Figure 4:
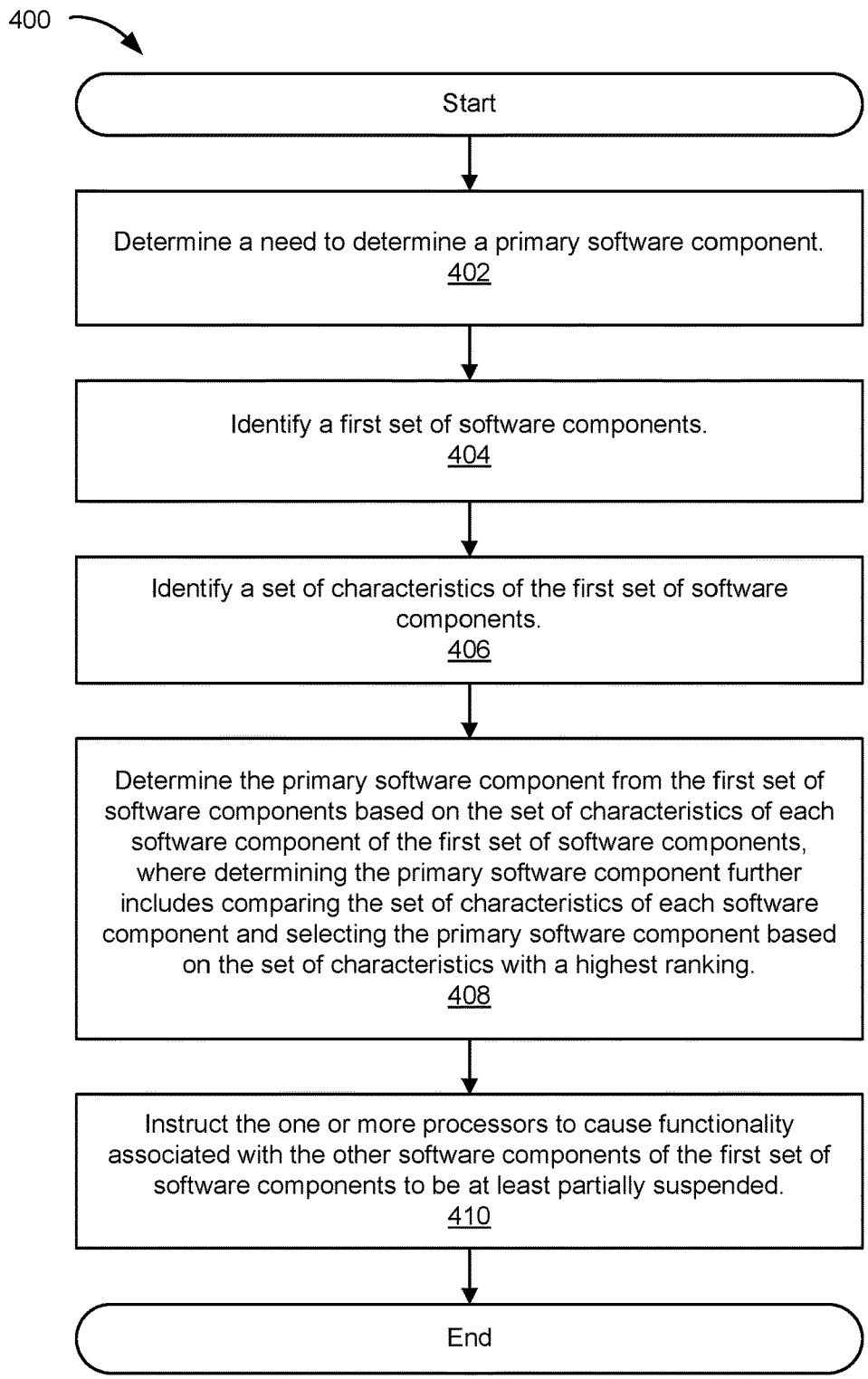
FIG. 4 shows a flowchart in accordance with one or more embodiments.

FIG. 4 shows a flowchart of a method. While the various steps in this flowchart are presented and described sequentially, one of ordinary skill will appreciate that some or all of the steps can be executed in different orders and some or all of the steps can be executed in parallel. Further, in one or more embodiments, one or more of the steps described below can be omitted, repeated, and/or performed in a different order. Accordingly, the specific arrangement of steps shown in FIG. 4 should not be construed as limiting the scope of the invention.

In STEP 402, a need to determine a primary software component is determined.

In STEP 404, a first set of software components are identified.

In STEP 406, a set of characteristics of the first set of software components are identified.

In STEP 408, the primary software component from the first set of software components is determined based on the set of characteristics of each software component of the first set of software components, where determining the primary software component further includes comparing the set of characteristics of each software component and selecting the primary software component based on the set of characteristics with a highest ranking.

In STEP 410, the one or more processors are instructed to cause functionality associated with the other software components of the first set of software components to be at least partially suspended.

While the present disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered as examples because other architectures can be implemented to achieve the same functionality.

The process parameters and sequence of steps described and/or illustrated herein are given by way of example only. For example, while the steps illustrated and/or described herein may be shown or discussed in a particular order, these steps do not necessarily need to be performed in the order illustrated or discussed. Some of the steps may be performed simultaneously. For example, in certain circumstances, multitasking and parallel processing may be advantageous. The various example methods described and/or illustrated herein may also omit one or more of the steps described or illustrated herein or include additional steps in addition to those disclosed.

Embodiments may be implemented on a specialized computer system. The specialized computing system can include one or more modified mobile devices (e.g., laptop computer, smart phone, wearables like a smart watch, personal digital assistant, tablet computer, or other mobile device), desktop computers, smart televisions, smart home appliances, electronic kiosk stands, smart automobiles, servers, blades in a server chassis, or any other type of computing device(s) that include at least the minimum processing power, memory, and input and output device(s) to perform one or more embodiments.

Figure 5:
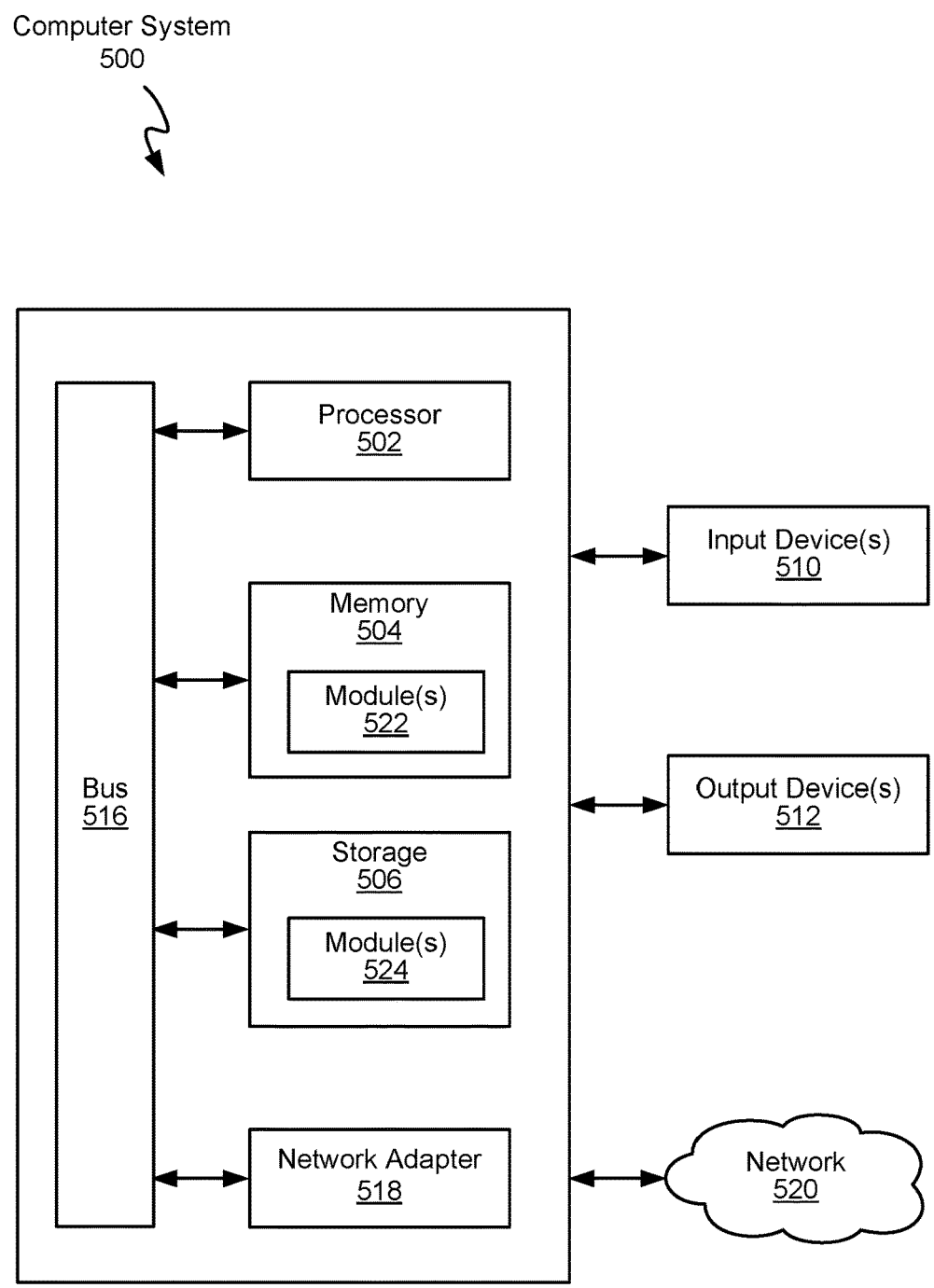
FIG. 5 shows a computer system in accordance with one or more embodiments.

For example, as shown in FIG. 5, the computing system 500 may include one or more computer processor(s) 502, associated memory 504 (e.g., random access memory (RAM), cache memory, flash memory, etc.), one or more storage device(s) 506 (e.g., a hard disk, an optical drive such as a compact disk (CD) drive or digital versatile disk (DVD) drive, a flash memory stick, etc.), a bus 516, and numerous other elements and functionalities. The computer processor(s) 502 may be an integrated circuit for processing instructions. For example, the computer processor(s) may be one or more cores or micro-cores of a processor.

In one or more embodiments, the computer processor(s) 502 may be an integrated circuit for processing instructions. For example, the computer processor(s) 502 may be one or more cores or micro-cores of a processor. The computer processor(s) 502 can implement/execute software modules stored by computing system 500, such as module(s) 522 stored in memory 504 or module(s) 524 stored in storage 506. For example, one or more of the modules described in FIGS. 1A-1B (e.g., the manager module 162) can be stored in memory 504 or storage 506, where they can be accessed and processed by the computer processor 502. In one or more embodiments, the computer processor(s) 502 can be a special-purpose processor where software instructions are incorporated into the actual processor design.

The computing system 500 may also include one or more input device(s) 510, such as a touchscreen, keyboard, mouse, microphone, touchpad, electronic pen, or any other type of input device. Further, the computing system 500 may include one or more output device(s) 512, such as a screen (e.g., a liquid crystal display (LCD), a plasma display, touchscreen, cathode ray tube (CRT) monitor, projector, or other display device), a printer, external storage, or any other output device. The computing system 500 may be connected to a network 520 (e.g., a local area network (LAN), a wide area network (WAN) such as the Internet, mobile network, or any other type of network) via a network interface connection 518. The input and output device(s) may be locally or remotely connected (e.g., via the network 520) to the computer processor(s) 502, memory 504, and storage device(s) 506.

One or more elements of the aforementioned computing system 500 may be located at a remote location and connected to the other elements over a network 520. Further, embodiments may be implemented on a distributed system having a plurality of nodes, where each portion may be located on a subset of nodes within the distributed system. In one embodiment, the node corresponds to a distinct computing device. Alternatively, the node may correspond to a computer processor with associated physical memory. The node may alternatively correspond to a computer processor or micro-core of a computer processor with shared memory and/or resources.

For example, one or more of the software modules disclosed herein may be implemented in a cloud computing environment. Cloud computing environments may provide various services and applications via the Internet. These cloud-based services (e.g., software as a service, platform as a service, infrastructure as a service, etc.) may be accessible through a Web browser or other remote interface.

One or more elements of the above-described systems (e.g., FIGS. 1A, 1B, and 2) may also be implemented using software modules that perform certain tasks. These software modules may include script, batch, routines, programs, objects, components, data structures, or other executable files that may be stored on a computer-readable storage medium or in a computing system. These software modules may configure a computing system to perform one or more of the example embodiments disclosed herein. The functionality of the software modules may be combined or distributed as desired in various embodiments. The computer readable program code can be stored, temporarily or permanently, on one or more non-transitory computer readable storage media. The non-transitory computer readable storage media are executable by one or more computer processors to perform the functionality of one or more components of the above-described systems (e.g., FIGS. 1A, 1B, and 2) and/or flowcharts (e.g., FIGS. 3 and 4). Examples of non-transitory computer-readable media can include, but are not limited to, compact discs (CDs), flash memory, solid state drives, random access memory (RAM), read only memory (ROM), electrically erasable programmable ROM (EEPROM), digital versatile disks (DVDs) or other optical storage, and any other computer-readable media excluding transitory, propagating signals.

It is understood that a "set" can include one or more elements. It is also understood that a "subset" of the set may be a set of which all the elements are contained in the set. In other words, the subset can include fewer elements than the set or all the elements of the set (i.e., the subset can be the same as the set).

While the invention has been described with respect to a limited number of embodiments, those skilled in the art, having benefit of this disclosure, will appreciate that other embodiments may be devised that do not depart from the scope of the invention as disclosed herein.

What is claimed is:

1. A method, implemented by one or more processors, comprising:
   determining, by a first security component of a first application executing on a client device, a need to perform a sharable functional task;

identifying a set of software components installed on the client device and capable of performing variations of the sharable functional task, wherein variations of the sharable functional task are functionally overlapping and not identical;
establishing inter-app communication between the first security component and at least a second security component of the set of software components;
identifying a set of characteristics characterizing both the first security component and the second security component;
selecting, using the first security component and the second security component, the second security component as a primary security component for performing a variation of the sharable functional task based on the set of characteristics, wherein the set of characteristics includes at least a version number;
delegating, by the one or more processors, performance of the sharable functional task to the primary security component; and
instructing the one or more processors to cause functionality associated with the first security component to be at least partially suspended.

2. The method of claim 1, wherein the sharable functional task is a security scan of a resource associated with the client device.

3. The method of claim 2, further comprising:
determining, by the primary security component, that a problem condition is present, wherein the problem condition represents at least one selected from a group consisting of a privacy violation, a permissions violation, and a network request involving a malicious entity.

4. The method of claim 2, wherein the resource is at least one selected from a group consisting of a storage device, a file, an application, a remote entity identified by a black list, firmware, a sensor, and a device driver.

5. The method of claim 1, wherein the sharable functional task comprises:
performing safe browsing monitoring for malware based on at least one selected from a group consisting of known white lists, known black lists, and content inspection.

6. The method of claim 1, wherein the sharable functional task is a security scan of a second application, and the method further comprising:
detecting initiation of an installation process for installing the second application;
determining, by the primary security component, that the second application includes malware; and
reporting that the second application includes malware.

7. The method of claim 1, wherein the sharable functional task is a security scan of a resource; and the method further comprising:
detecting a network request associated with the resource;
using the network request to identify the resource;
determining, by the primary security component, that a problem condition is present; and
denying execution of the network request in response to the problem condition.

8. The method of claim 7, wherein the problem condition represents one selected from a group consisting of an incoming network request, an outgoing network request, a Hypertext Transfer Protocol (HTTP) request, an authentication request, a remote connection request, and a remote resource access request.

9. The method of claim 1, further comprising:
defining a set of predefined events defining actions associated with the client device; and
detecting, by an operating system of the client device, execution of an event of the set of predefined events, wherein determining the need to perform the sharable functional task is based on detection of the event.

10. The method of claim 9, wherein the sharable functional task is one selected from a group consisting of performing device data backup, performing a data loss prevention (DLP) function, locking the client device, wiping data from the client device, and performing a modification of security settings on the client device.

11. The method of claim 9, wherein the event is one selected from a group consisting of detection of a location coordinate based on a tracking function, detection of a location coordinate based on a signal flare function, incorrect passcode entry, airplane mode enablement, device power down, password disablement, a loss protection function, a predefined theft alert, a subscriber identification module (SIM) card removal, and low battery detection.

12. The method of claim 1:
wherein the first security component continues a minimal execution to monitor an execution status of the primary security component; and
further comprising resuming, by the first security component, a regular execution upon detecting that the primary security component is no longer installed or executing.

13. The method of claim 1, further comprising:
receiving result data from the primary security component, wherein the result data includes information about the execution of the second security component as the primary security component; and
providing the result data to the first security component.

14. The method of claim 1, wherein instructing the one or more processors to cause functionality associated with the first security component to be at least partially suspended comprises:
instructing the one or more processors to cause a first set of functionality associated with the first security component to be suspended and to cause a second set of functionality associated with the first security component to continue executing, wherein the second set of functionality associated with the first security component is not duplicative with the sharable functional task.

15. The method of claim 1, wherein:
the set of characteristics comprises an identifier for the first security component and the second security component; and
determining the primary security component further comprises comparing the identifier of the first security component and the second security component with a presence list including priority information associated with each identifier.

16. The method of claim 1, wherein the first security component and the second security component overlap in performing different versions of an authentication function.

17. A system comprising:
a computer processor; and
a manager module executing on the computer processor and configured to cause the computer processor to:
determine a need to perform a sharable functional task;
identify a set of software components installed on the client device and capable of performing variations of the sharable functional task, wherein variations of the sharable functional task are functionally overlapping and not identical;

identify a set of characteristics characterizing both a first security component and a second security component of the set of software components;
select the second security component as a primary security component for performing a variation of the sharable functional task based on the set of characteristics, wherein the set of characteristics includes at least a version number;
delegate, using the computer processor, performance of the sharable functional task to the primary security component; and
instruct the computer processor to cause functionality associated with the first security component to be at least partially suspended.

18. A non-transitory computer-readable storage medium comprising a plurality of instructions configured to execute on at least one computer processor to cause the computer processor to:
determine, using a first security component of a first application, a need to perform a sharable functional task;
identify a set of software components installed on the client device and capable of performing variations of the sharable functional task, wherein variations of the sharable functional task are functionally overlapping and not identical;
establish communication with the first security component and at least a second security component of the set of software components;
identify a set of characteristics characterizing both the first security component and the second security component;
select, using the first security component and the second security component, the second security component as a primary security component for performing a variation of the sharable functional task based on the set of characteristics, wherein the set of characteristics includes at least a version number;
instruct the at least one computer processor to delegate performance of the sharable functional task to the primary security component; and
instruct the at least one computer processor to cause functionality associated with the first security component to be at least partially suspended.

19. A method, implemented by one or more processors, comprising:
determining, using a first security component of a first application, a need to perform a sharable functional task;
identifying a first set of software components capable of performing variations of the sharable functional task, wherein variations of the sharable functional task are functionally overlapping and not identical, and wherein the first set of software components comprises at least a second security component;
identifying a set of characteristics characterizing each software component of the first set of software components;
selecting, using the first security component and the second security component, the second security component as a primary security component for performing a variation of the sharable functional task based on a rank value of each of the first set of software components, wherein the rank values are calculated using the set of characteristics;
delegating, by the one or more processors, performance of the sharable functional task to the primary security component; and
suspending, by the one or more processors, functionality associated with the first security component.

20. The method of claim 19, wherein the sharable functional task is a security scan of a resource associated with the client device, the method further comprising:
determining, by the primary security component, that a problem condition is present, wherein the problem condition represents at least one selected from a group consisting of a privacy violation, a permissions violation, and a network request involving a malicious entity.

21. The method of claim 19, wherein the sharable functional task is a security scan of a second application associated with the client device, the method further comprising:
detecting initiation of an installation process for installing the second application;
determining, by the primary security component, that the second application includes malware; and
reporting that the second application includes malware.

22. The method of claim 19, wherein the sharable functional task is a security scan of a resource, the method further comprising:
detecting a network request associated with the resource;
using the network request to identify the resource;
determining, by the primary security component, that a problem condition is present; and
denying execution of the network request in response to the problem condition.

23. The method of claim 19, further comprising:
defining a set of predefined events defining actions associated with the client device; and
detecting, by an operating system of the client device, execution of an event of the set of predefined events, wherein determining the need to perform the sharable functional task is based on detection of the event.

24. The method of claim 19, further comprising:
ranking the first set of software components according to ranking criteria; and
selecting the primary security component based on a highest ranking, wherein the ranking criteria is used to rank each software component of the first set of software components based on the set of characteristics of each software component.

25. The method of claim 24, further comprising:
upon detecting that the primary security component is no longer installed or executing, instructing the one or more processors to cause functionality associated with a third security component with a second to highest ranking to be re-enabled.

26. The method of claim 19, further comprising:
upon detecting that the primary security component is no longer installed or executing, instructing the one or more processors to cause functionality associated with a third security component to be re-enabled.

27. The method of claim 19, further comprising upon detecting that the primary security component is no longer installed or executing:
identifying a second set of software components, wherein the second set of software components is different from the first set of software components;
identifying a set of characteristics characterizing each software component of the second set of software components;

selecting a third security component from the second set of software components based on the set of characteristics of the second set of software components; and instructing the one or more processors to cause functionality associated with the third security component to be enabled.

28. The method of claim 19, further comprising:

receiving result data from the primary security component, wherein the result data includes information about the execution of the primary security component; and providing the result data to at least one software component of the first set of software components.

29. The method of claim 19, wherein an application container includes a subset of the first set of software components, the method further comprising:

resuming, by the one or more processors, execution of the first security component within the application container after completion of the sharable functional task by the primary security component.

* * * * *